United States Patent
Ciubotariu et al.

(10) Patent No.: US 11,861,007 B1
(45) Date of Patent: Jan. 2, 2024

(54) DETECTING CONTAINER THREATS THROUGH EXTRACTING KERNEL EVENTS TO PROCESS IN RESERVED SCANNER CONTAINERS

(71) Applicant: Amazon Technologies, Inc., Seattle, WA (US)

(72) Inventors: Mircea Ciubotariu, Culver City, CA (US); Shlomo Yehezkel, West Hills, CA (US); Peter Ferrie, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 354 days.

(21) Appl. No.: 17/213,575

(22) Filed: Mar. 26, 2021

(51) Int. Cl.
*G06F 21/56* (2013.01)
*G06F 9/455* (2018.01)

(52) U.S. Cl.
CPC ........ *G06F 21/566* (2013.01); *G06F 9/45558* (2013.01); *G06F 21/567* (2013.01); *G06F 2009/45579* (2013.01); *G06F 2009/45587* (2013.01); *G06F 2009/45591* (2013.01)

(58) Field of Classification Search
CPC .. G06F 21/566; G06F 9/45558; G06F 21/567; G06F 2009/45579; G06F 2009/45587; G06F 2009/45591
See application file for complete search history.

(56) References Cited

U.S. PATENT DOCUMENTS

| | | | | |
|---|---|---|---|---|
| 8,302,192 B1* | 10/2012 | Cnudde | ................... | G06F 11/30 726/25 |
| 8,370,931 B1* | 2/2013 | Chien | ................... | G06F 21/566 709/224 |
| 2013/0326506 A1* | 12/2013 | McGrath | ................. | H04L 47/70 718/1 |
| 2015/0332043 A1* | 11/2015 | Russello | ............. | G06F 11/3466 726/22 |
| 2016/0359917 A1* | 12/2016 | Rao | ...................... | H04L 43/0811 |
| 2021/0182387 A1* | 6/2021 | Zhu | ........................ | G06F 21/567 |
| 2022/0171648 A1* | 6/2022 | Rodriguez | ............ | G06F 9/5072 |
| 2022/0263835 A1* | 8/2022 | Pieczul | ................. | H04L 63/105 |

\* cited by examiner

*Primary Examiner* — Bruce S Ashley
(74) *Attorney, Agent, or Firm* — Nicholson DeVos Webster & Elliott LLP

(57) ABSTRACT

Techniques for detecting container threats are described. A method of detecting container threats includes receiving, by a scanning agent on a scanner container on a host in a provider network, event data from a plurality of collection agents corresponding to a plurality of customer containers on the host, determining, by the scanning agent, the event data matches at least one known threat, and generating, by the scanning agent, event findings associated with the event data.

17 Claims, 8 Drawing Sheets

DETECTING CONTAINER THREATS THROUGH EXTRACTING KERNEL EVENTS TO PROCESS IN RESERVED SCANNER CONTAINERS

BACKGROUND

Many companies and other organizations operate computer networks that interconnect numerous computing systems to support their operations. For example, data centers housing significant numbers of interconnected computing systems have become commonplace. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources. Virtualization technologies, for example, may allow a single physical computing machine to be shared among multiple users by providing each user with one or more virtual machines hosted by the single physical computing machine. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

A recently popular virtualization technology is application containerization. At a high level, containers are a method of operating system virtualization that allow users to run software applications and their dependencies in resource-isolated processes and in a consistent manner across different deployment environments. To enable container-based applications to run consistently across various deployment environments, a container is constructed as an atomic, self-contained package of software that includes everything needed to run the software contained therein (that is, a container includes any necessary code, runtime, libraries, packages, and so forth). The use of containers has become a popular application development and deployment tool in part because containers generally are portable, lightweight, standardized, and easy to deploy in a consistent manner regardless of deployment environment. As containers gain more popularity, it is important to provide adequate security for the applications running inside them, making sure they were not compromised by detecting possible threats through behaviors at the operating system or kernel level.

BRIEF DESCRIPTION OF DRAWINGS

Various embodiments in accordance with the present disclosure will be described with reference to the drawings, in which.

DETAILED DESCRIPTION

Figure 1:
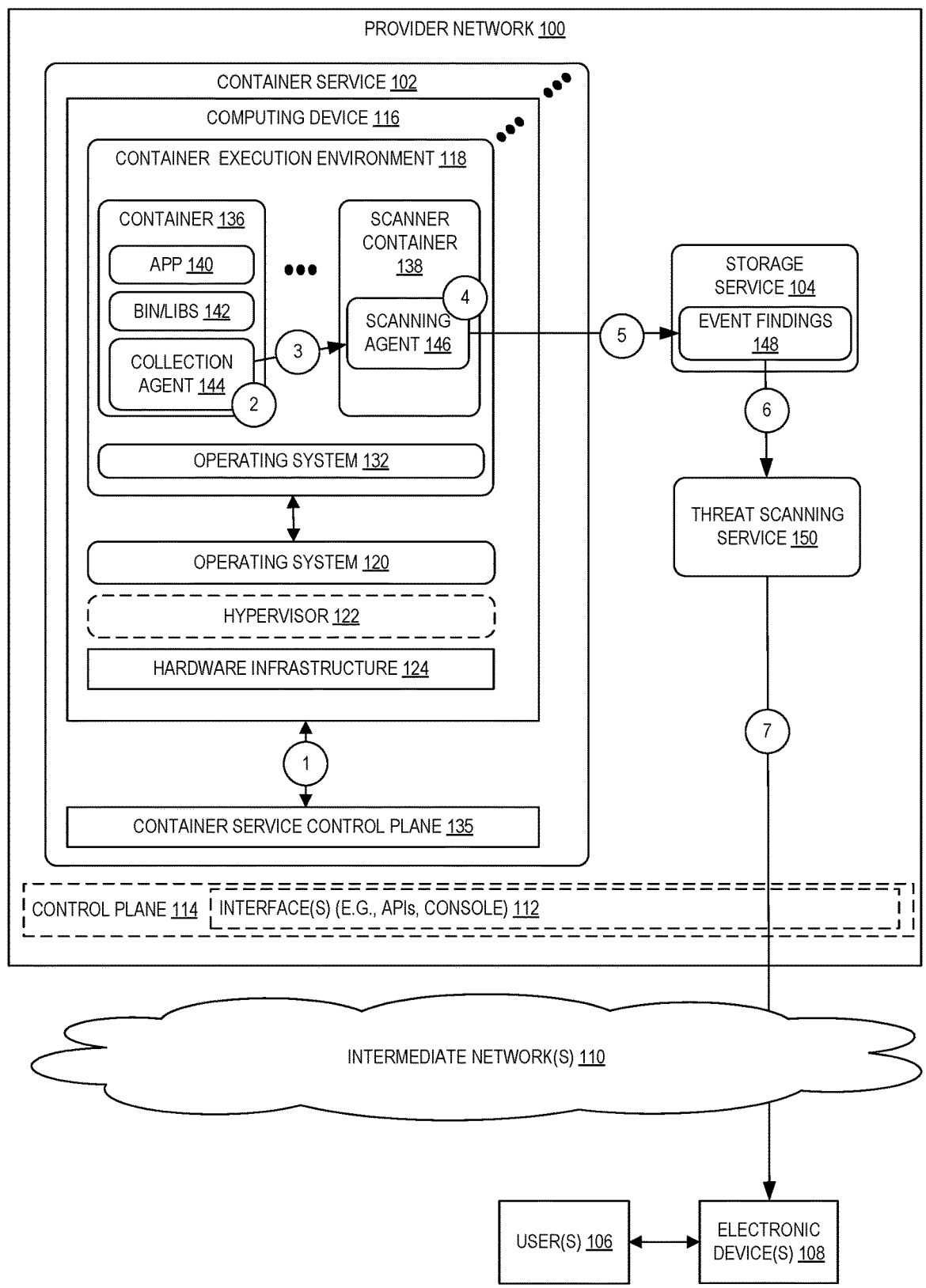
FIG. 1 is a diagram illustrating an environment for detecting container threats according to some embodiments.

The present disclosure relates to methods, apparatus, systems, and non-transitory computer-readable storage media for detecting container threats. The use of containers to develop and deploy software applications continues to increase in popularity. At a high level, containers are a method of operating system virtualization that allow users to run an application and its dependencies in resource-isolated processes and in a consistent manner across different deployment environments. To enable container-based applications to run consistently across various deployment environments, containers are constructed as atomic, self-contained packages of software that includes everything needed to run the software contained therein (that is, a container includes any necessary code, runtime, libraries, packages, and so forth). The use of containers has become a popular application development and deployment tool at least in part because containers are generally portable, lightweight, standardized, and easy to deploy in a consistent manner regardless of deployment environment.

A container image representing a containerized software application is often comprised of one or more "base" image layers which can be optionally "overlaid" with one or more user-created layers. The base image layers, for example, typically include various types of commonly used software applications such as operating systems, database servers, web-application frameworks, and so forth, upon which various types of user applications can be created. An example container image, for example, might include one base image layer including a popular operating system distribution, another base image layer including a popular open-source database server, and a user may overlay those images with a custom container image including user-created software that depends on the software contained in the underlying layers. A container image can be executed by a container runtime, which can be installed at a host operating system. Depending on the format of the container image, any of a number of available container runtimes can be used including, for example, container runtimes provided by the Docker® or other container platforms.

According to some embodiments, to provide security to each container, an agent needs to be deployed to each container. This poses a challenge in terms of performance impact. For example, agents are responsible for collecting information (e.g., application behavior), identifying threats by matching the information against known threats, and then initiating reporting and/or mitigation actions when a threat is identified. This can lead to significant resource usage by the agent, reducing the resources available to the applications executing in the container.

Accordingly, embodiments split the responsibility between collecting information and analyzing the information. For example, to minimize the impact on a given container, a collection agent is deployed to the container which is responsible for filtering and collecting specific events. This event data is then provided to a scanner container which includes a scanning agent. The scanner container may be a reserved container on a given instance that is hosting containers. In some embodiments, a single scanner container may be reserved, or a plurality of scanner containers may be reserved. The scanning agent is responsible for scanning the event data to identify threats and then report and/or mitigate those threats. By offloading the scanning agent to a single container, performance of every other container is improved as more resources are available in each container. Additionally, as scanning agents receive regular updates, there is a greater risk of introduction of a bug, malicious code, or other errors into the scanning agent. By isolating the scanning agent to its own container, any such errors are also isolated from impacting customer workloads in their containers. This improves overall uptime and provides a better customer experience.

FIG. 1 is a diagram illustrating an environment for detecting container threats according to some embodiments. In some embodiments, a container service 102 and a storage service 104, among any number of other possible services, operate as part of a service provider network 100 and each comprises one or more software modules executed by one or more electronic devices at one or more data centers and geographic locations. A user 106 using one or more electronic device(s) 108 (which may be part of or separate from the service provider network 100) can interact with the various services of the service provider network 100 via one or more networks, such as the internet.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may use one or more user accounts that are associated with a customer account, though these terms may be used somewhat interchangeably depending upon the context of use. Users may interact with a provider network 100 across one or more intermediate networks 110 (e.g., the internet) via one or more interface(s) 112, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane 114 of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may provide users the ability to control or use compute resources (e.g., a "compute instance," such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly use a compute resource (e.g., provided by a hardware virtualization service) hosted by the provider network to perform a variety of computing tasks. Additionally, or alternatively, a user may indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As indicated above, some users of a service provider network 100 desire the ability to run containerized software applications using computing resources provided by the service provider network. A service provider network 100, for example, may include a container service 102 that provides scalable container management enabling users to run containerized software applications on managed clusters of compute instances. Using API calls or other interfaces 112, for example, users can use a container service 102 to launch containerized applications and to manage container placement, among other possible configurations. In other embodiments, a container service 102 can enable users to run containers without the user needing to explicitly provision, configure, or scale compute instance clusters upon which the containers are to execute.

The container service 102 can be a container orchestration and management service (referred to in various implementations as a container service, cloud container service, container engine, or container cloud service) that allows users of the cloud provider network to instantiate and manage containers. In some embodiments the container service 102 may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As shown in FIG. 1, container service 102 includes a container service control plane 135 which is responsible for provisioning and configuring computing devices (e.g., hosts) of the container service to host containers, placing containers onto hosts, etc. In some embodiments, at numeral 1, container service control plane 135 provisions a computing device 116 to support one or more container execution environments (for example, container execution environments 118). The provisioning of a new computing device 116 can include initially launching an operating system 120 to be used to support the one or more container execution environments 118 and other operations of the computing device 116. As shown in FIG. 1, the operating system 120 can be a guest operating system of a hypervisor 122 running on and abstracting the hardware infrastructure 124 of the computing device 116A; in other examples, the operating system 120 can be a standalone operating system running in a non-virtualized environment. Although the example of FIG. 1 is discussed with respect to a single computing device hosting a single execution environment, in various embodiments container service 102 may include a plurality of computing devices which may each host one or more execution environments.

As shown, the container execution environment 118 may include a plurality of containers 136, 138 (for example, the container 136 including application code 140 and any dependent binaries and libraries 142). As described above, to provide container-level security, the container 136 also includes a collection agent 144. Collection agent 144 collects information about activities performed on the container by application 140 or other applications running on the container. In some embodiments, the collection agent 144 is embedded in the container image which was used to launch the container or may be deployed as a kernel module. At numeral 2, the collection agent begins collecting event data based on activities that are performed on the container. These activities may include system calls (syscalls) which include calls from application 140 or other applications made to the kernel of the operating system on which it is executing, such as operating system 132 or 120. In some embodiments, these calls may be intercepted by the collection agent via the extended Berkeley Packet Filter (eBPF) interface.

As the collection agent collects event data, it provides the event data to scanning agent 146 on scanner container 138. In some embodiments, when the computing device initializes the container pool, the scanner container is reserved, and a communication channel is established between the collection agent on each container and the scanning agent on the scanner container. In some embodiments, this communication channel includes a data bus (e.g., a system bus or other internal bus that connect components of the computing device to the computing device's motherboard), connecting the scanner container and the other containers. As discussed, scanner container 138 may be a reserved container on the computing device 116 that is dedicated to performing threat scanning on the event data gathered by all or some of the collection agents running on other containers on the computing device. The scanning agent 146 can perform malware scanning on the event data, as shown at numeral 3. For example, the scanning agent may perform heuristics-based behavioral patterns in the event data received at numeral 4. In some embodiments, the scanning agent includes rules that indicate actions to be performed for specific pattern matches. For example, a detection event may be triggered when some patterns are matched. When a detection event is triggered, the scanning agent can write the detection event to a storage location, such as event findings 148 in storage service 104, as shown at numeral 5.

Additionally, or alternatively, a behavior pattern match may trigger other actions. Such behaviors may be benign (e.g., a user is downloading and installing software from a safe source), but such behaviors may also be malicious (e.g., a DNS call is made for a domain that is a known threat, and then a file is downloaded and installed). For example, a behavior pattern match may trigger a file scan of the file system associated with the container that exhibited the behavior. In such instances, one or more files may be provided to the scanning agent by the collection agent for scanning. Alternatively, the file system of the affected container may be mounted to the scanner container (e.g., in a sidecar pattern). This allows the scanning agent to directly scan the file system based on the behavior match, without transferring files and the costs that would be incurred.

When a new event is written to event findings 148, the threat scanning service 150 can obtain the event data at numeral 6. In some embodiments, threat scanning service 150 may be continuously, or periodically, monitoring event findings 148 for changes. Additionally, or alternatively, the storage service 104 may push notifications to the threat scanning service 150 when new events are written to event findings 148. At numeral 7, the threat scanning service 150 can send a notification associated with the event to user 106 via electronic device 108. The notification may indicate the threat associated with the match (e.g., the malware), the events that were matched, the user (if any) associated with the events, etc. The user 106 may choose to perform a mitigation action, such as removing the container from the host, running a complete malware scan on the container, etc. In some embodiments, one or more mitigation actions may be performed by the threat scanning service 150 and/or by scanning agent 146 by default, without additional user input.

Figure 2:
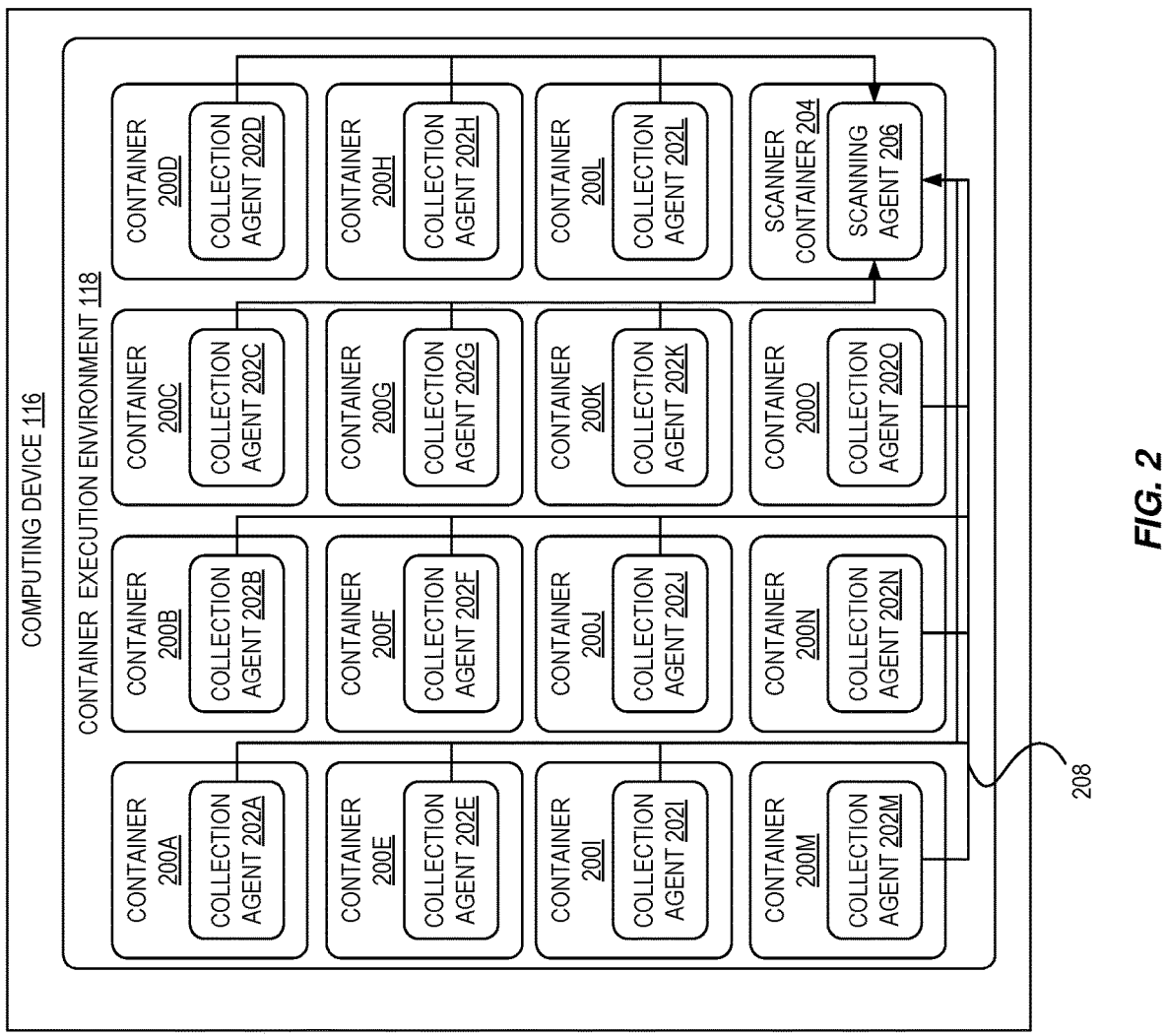
FIG. 2 is a diagram illustrating an example of containers deployed to a container execution environment according to some embodiments.

FIG. 2 is a diagram illustrating an example of containers deployed to a container execution environment according to some embodiments. As discussed, a given computing device (e.g., host) can include a plurality of containers. The number of containers that can be simultaneously deployed to a given host may vary depending on the resources of the host. This number of containers may be determined when the host is deployed. For example, when computing device 116 is deployed to host containers, it may be allocated container slots for 16 containers, as shown in FIG. 2. Of these 16 container slots, 15 are made available to the customer to execute their containers 200A-200O and one is reserved for scanner container 204. By reserving a container for, and doing the scanning in, the scanner container 204, as opposed to on the host or inside the pool containers 200A-200O, the impact of scan performance on the usable pool of containers is minimized, resulting in consistent results with seamless protection. Additionally, any compromise of the actual scanner, e.g., exploits, are isolated in the scanner container, without exposing the rest of the pool to threats. Although the example of FIG. 2 illustrates a single reserved scanner container, in some embodiments, based on the actual capacity of the host, more than one scanner container can be used. However, in general the number of scanner containers needed will be very small compared to the host's container capacity. For example, the number of scanner containers may vary between a single scanner container to up to approximately 5% (or other maximum percentage) of the capacity of the host. In some embodiments, if there are multiple scanner containers deployed to a given host, then the load may be split evenly between them. For example, if a host has 98 customer containers and two scanner containers, then each scanner container is responsible for scanning event data obtained from 49 of the customer containers. Alternatively, a scanner container may be responsible for the first fixed number of containers deployed, a second scanner container may be responsible for a second fixed number of containers deployed, and so on. For example, the first scanner container may receive event data from the first 25 customer containers deployed to the host, the second scanner container may receive event data from the next 25 customer containers, and so on.

In some embodiments, all of the containers 200A-200O on a given host are associated with the same customer. Alternatively, the host may include containers associated with different customers and/or different accounts. The allocation of containers between customer-usable and scanner reserved may be performed at deployment of host and/or at setup of the container execution environment. Additionally, during setup, a shared connection 208 between the containers 200A-200O and the scanner container 204 is established. In some embodiments, the shared connection may be a data bus or multiple data buses that are accessible to the containers 200A-200O and the scanner container 204. During execution of customer workloads, each container's collection agent 202A-202O intercepts calls made on those containers (e.g., syscalls) and writes events corresponding to those syscalls to the data bus. In some embodiments, the events may include the system call, the calling process, the destination of the call, and/or other data or metadata associated with the syscall. In some embodiments, the collection agent 202A-202O can add an identifier associated with its container 200A-200O with each event it adds to the shared connection. The scanning agent 206 reads the events from the shared connection and then performs malware scanning on the events. For example, the scanning agent can perform heuristic pattern matching on the events for a given container and perform an action based on any matches.

Figure 3:
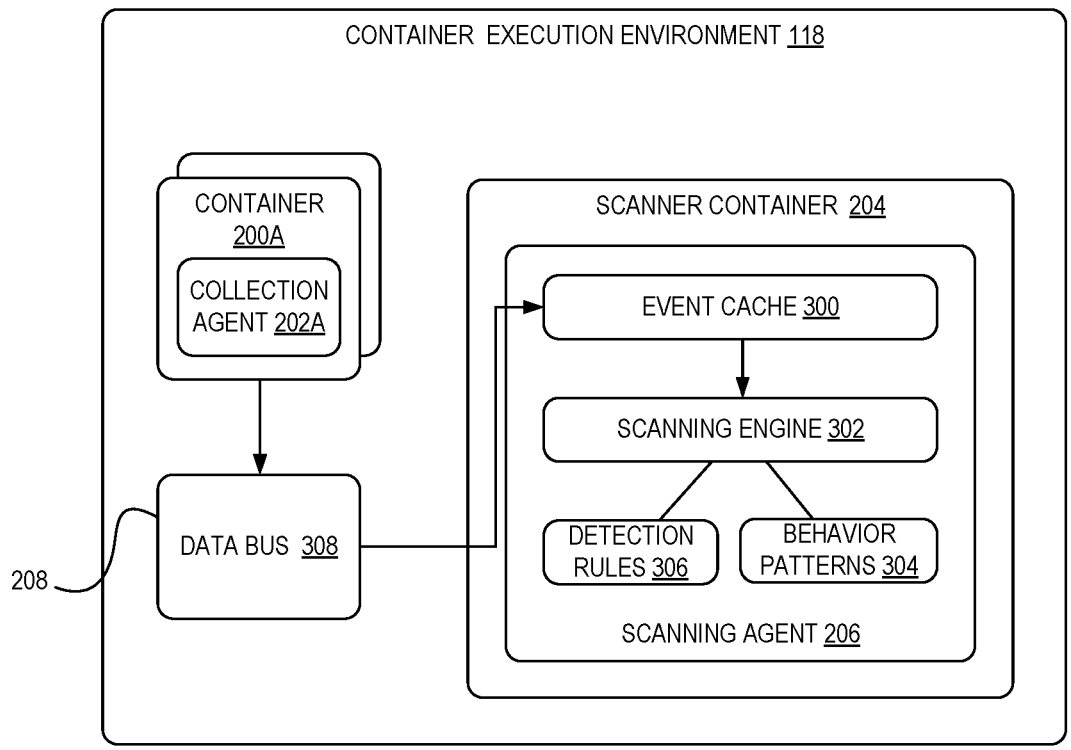
FIG. 3 is a diagram illustrating scanner container according to some embodiments.

FIG. 3 is a diagram illustrating scanner container according to some embodiments. As shown in FIG. 3, and as discussed, each collection agent, such as collection agent 202A, can provide events to scanning agent 206 over a shared connection 208. In the example of FIG. 3, the shared connection is a data bus 308. The collection agent(s) 202A write events to the data bus 308 which are then read by scanning agent 206. In some embodiments, the scanning agent 206 includes an event cache 300. The event cache 300 can include local memory, a local buffer, etc. where the scanning agent 206 stores events currently being processed. In some embodiments, batches of events are read into event cache 300 from data bus 308. Alternatively, in some embodiments, scanning agent 206 reads directly from data bus 308 without an intervening event cache.

As events are read by scanning agent 206, they are provided to scanning engine 302 (either directly from data bus 308, or via event cache 300). In some embodiments, the scanning engine 302 can attempt to match the events to one or more behavior patterns 304. The behavior patterns 304 may constitute threat signatures that are associated with known threats (e.g., malware). The behavior patterns may include a sequence of one or more events that are either directly associated with a known threat pattern of events or are strongly correlated. If the scanning engine determines that a sequence of events from the collection agents match with all or part of a behavior pattern, then the scanning engine 302 can perform a detection action based on one or more detection rules 306. For example, the detection rules 306 may be associated with particular known threats or groups of known threats and/or with the underlying behavior patterns. When a behavior pattern is matched, the corresponding detection rule or rules can be read by scanning engine 302. The action defined by that rule can then be performed by the scanning engine. The action may include notifying the user of the threat, removing the container from the execution environment, disconnecting the container from any networks to which it may be connected (e.g., removing a network adapter associated with the container, or other actions.

In some embodiments, the scanning engine 302 can also scan the file system and/or memory of a container. For example, the file system associated with the container being tested may be mounted to the scanner container according to a sidecar pattern. The scanning engine can then scan one or more files in the file system. For example, the scanning engine 302 can perform signature matching by calculating a hash value of the files and comparing them to hash values of known threats. Similarly, the memory of the container may be dumped to the file system to be scanned by the scanning engine. Alternatively, the scanning engine can identify a host process associated with the event data. The scanning engine can then communicate with the host operating system and/or hypervisor to read at least a portion of host memory associated with the host process. The scanning engine can then scan this portion of memory for malware. This enables the scanning engine to scan the files/memory of a container without requiring the data to be transferred off-host, which would incur significant network costs and potentially expose other hosts to malware in the process. As discussed, in some embodiments, a detection rule may trigger the scanner container to perform a file scan/memory scan of the affected container.

Figure 4:
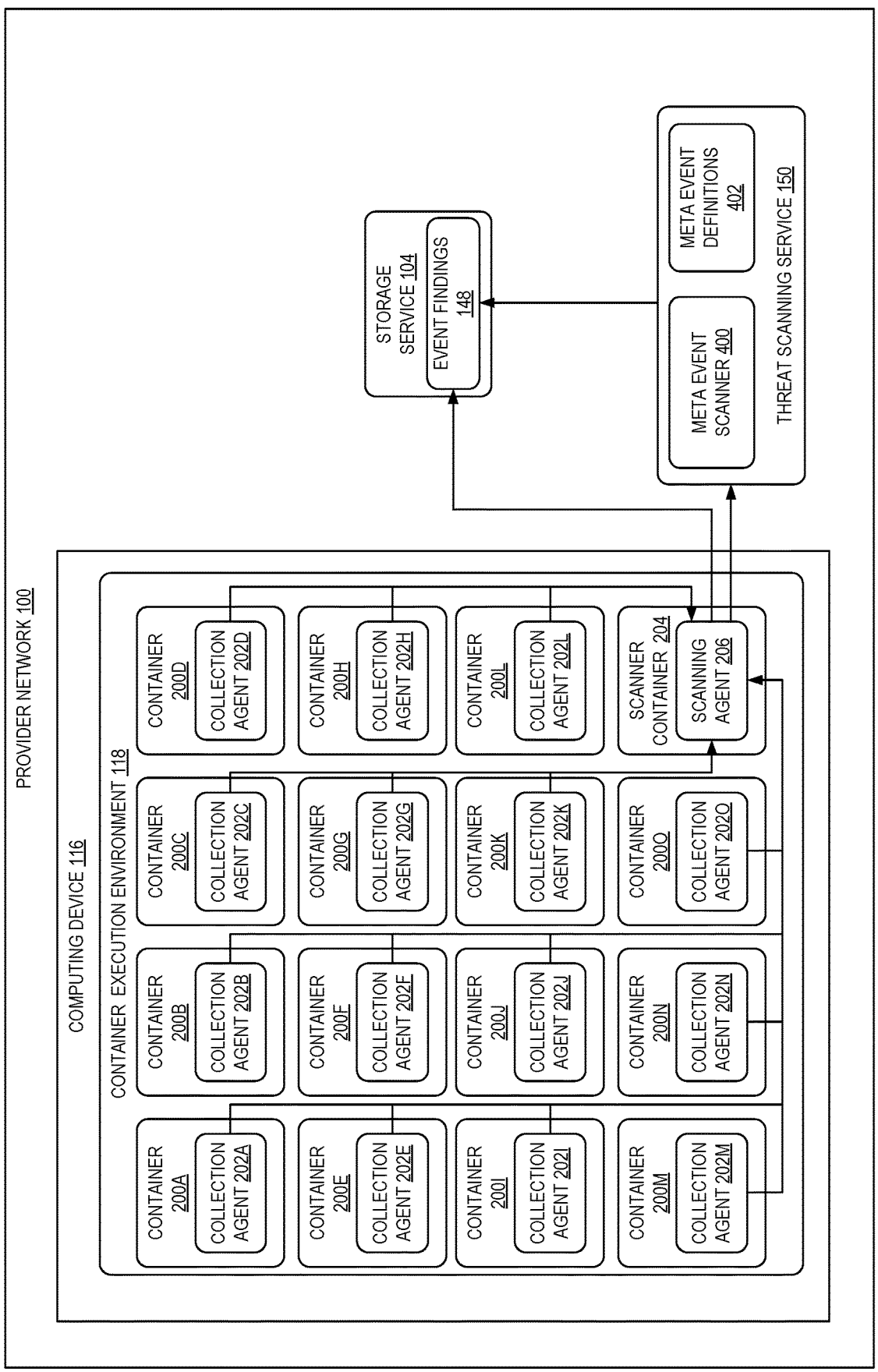
FIG. 4 is a diagram illustrating an environment for detecting container threats according to some embodiments.

FIG. 4 is a diagram illustrating an environment for detecting container threats according to some embodiments. As discussed, a scanning agent 206 on a scanner container 204 may receive event data from a plurality of collection agents 202A-202O on a plurality of customer-usable containers 200A-200O. The scanning agent 206 is then responsible for performing malware scanning of the events. However, in some embodiments, additional processing of the events may be performed by threat scanning service 150. For example, a detection rule may specify that a particular known threat (or behavior pattern) requires further processing by threat scanning service 150. Additionally, or alternatively, the scanning agent 206 may identify meta-events. A meta-event may include a pattern of specific events that needs further inspection by threat scanning service 150.

When such a meta-event is identified, the scanning agent 206 can send the data and/or metadata associated with the event or events associated with the meta-event to threat scanning service 150. Threat scanning service 150 may be a cloud-based malware scanning service that is part of provider network 100 or external to provider network 100. The threat scanning service 150 includes a meta event scanner 400 which compares the event(s) associated with the meta-event to meta-event definitions 402. If there is a match, the threat scanning service can instruct the scanning agent to perform a particular action, such as isolating the container, performing a file system/memory scan, etc. The threat scanning service 150 can also update event findings 148 with information about the meta-event. In some embodiments, event findings 148 are high level data being produced by the scanning agent or the threat scanning service. The event findings are then made available to the customer, as discussed above.

Figure 5:
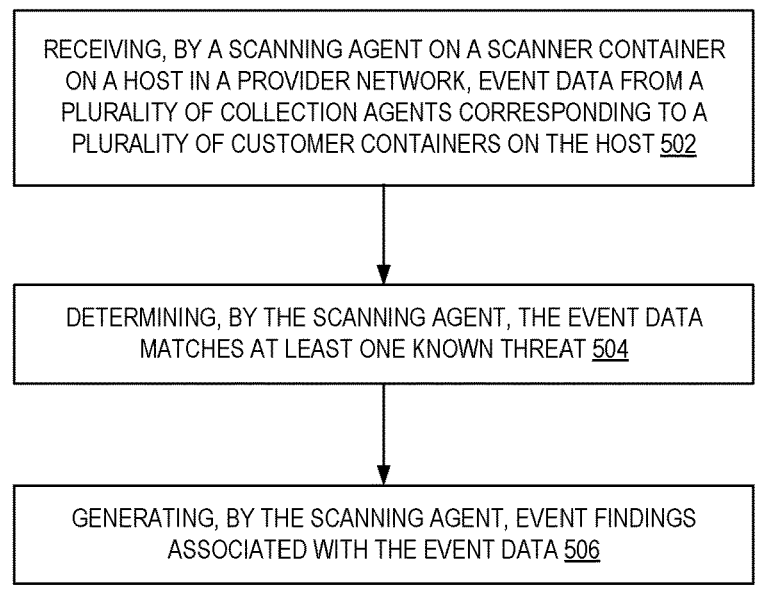
FIG. 5 is a flow diagram illustrating operations of a method for detecting container threats according to some embodiments.

FIG. 5 is a flow diagram illustrating operations 500 of a method for detecting container threats according to some embodiments. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 500 are performed by scanner container 138, collection agent 144, scanning agent 146, etc. of the other figures.

The operations 500 include, at block 502, receiving, by a scanning agent on a scanner container on a host in a provider network, event data from a plurality of collection agents corresponding to a plurality of customer containers on the host. In some embodiments, the host is deployed as part of a container service of the provider network, wherein the host is associated with a container capacity, and wherein at deployment a portion of the container capacity is reserved for one or more scanner containers. For example, in some embodiments, the portion of the container capacity is between one container and up to a maximum percentage of the container capacity reserved for the one or more scanner containers. In some embodiments, the maximum percentage is approximately five percent of container capacity. In some embodiments, receiving the event data includes obtaining, by the scanning agent, the event data from a data bus, wherein each collection agent adds the event data as it is collected to the data bus. In some embodiments, at least one collection agent is embedded in a container image corresponding to at least one customer container to which it is deployed.

The operations 500 further include, at block 504, determining the event data matches at least one known threat. In some embodiments, the event data includes system calls intercepted by the plurality of collection agents. In some embodiments, in response to determining the event data matches at least one known threat, the operations further include scanning one or more files of a file system of a customer container associated with the event data for malware. In some embodiments, this includes mounting the file system of the customer container to the scanner container. As discussed, the event data can be determined to match at least one known threat by matching the events to behavior patterns or other heuristics-based matching. In some embodiments, the operations further include scanning at least one region of memory of the host, the at least one region of memory associated with a process corresponding to the event data.

The operations 500 further include, at block 506, generating event findings associated with the event data. In some embodiments, the operations further include storing the event findings in a storage location of a storage service, wherein in response to storing the event findings a notification is sent to a user associated with at least one customer container corresponding to the event data, wherein the notification includes information about the at least one known threat. In some embodiments, the operations further include determining second event data matches at least one second known threat, determining the event data and the second event data correspond to a meta-event, and sending the meta-event to a threat scanning service, the threat scanning service to scan the meta-event for known threats.

In some embodiments, the operations include configuring a computing device of a container service to host a plurality of containers, the plurality of containers including one or more customer containers and at least one scanner container, deploying the scanner container to the computing device, the scanner container including a scanning agent, monitoring, by a collection agent on at least one customer container deployed to the computing device, system calls generated on the at least one customer container, sending, by the collection agent, events corresponding to the system calls to the scanning agent on the scanner container, scanning, by the scanning agent, the events for malware, and sending, by the scanning agent, detection event findings corresponding to detected malware to an event findings datastore, wherein the detection event finds are provided to a customer associated with the customer container. In some embodiments, the scanning agent includes a scanning engine which determines whether the events match at least one behavior pattern corresponding to known threat. In some embodiments, the computing device includes a shared data bus and wherein the collection agent adds the events to the shared data bus and the scanning agent reads the events from the shared data bus.

Figure 6:
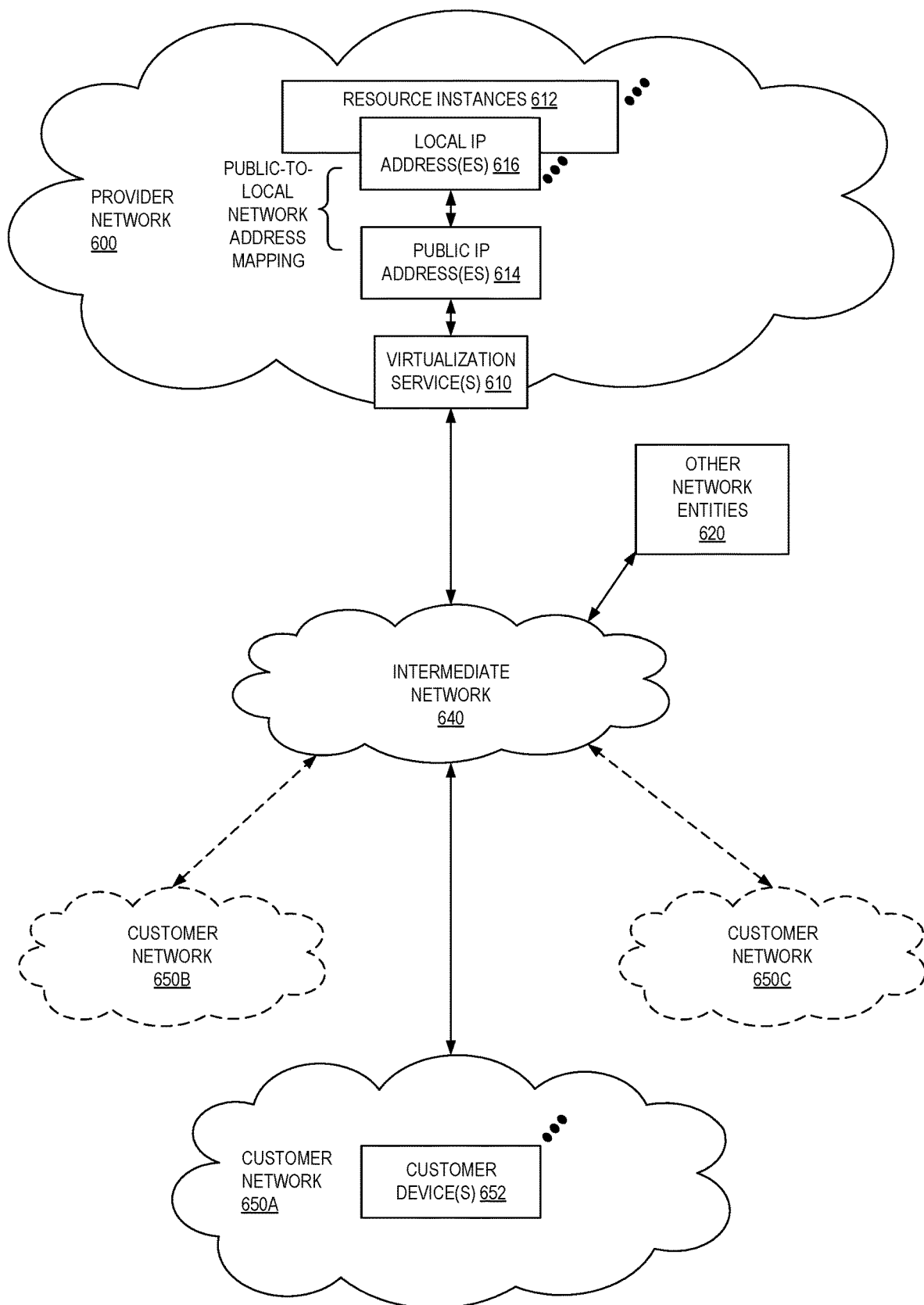
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more customer networks 650A-650C (may also be referred to as client networks) including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
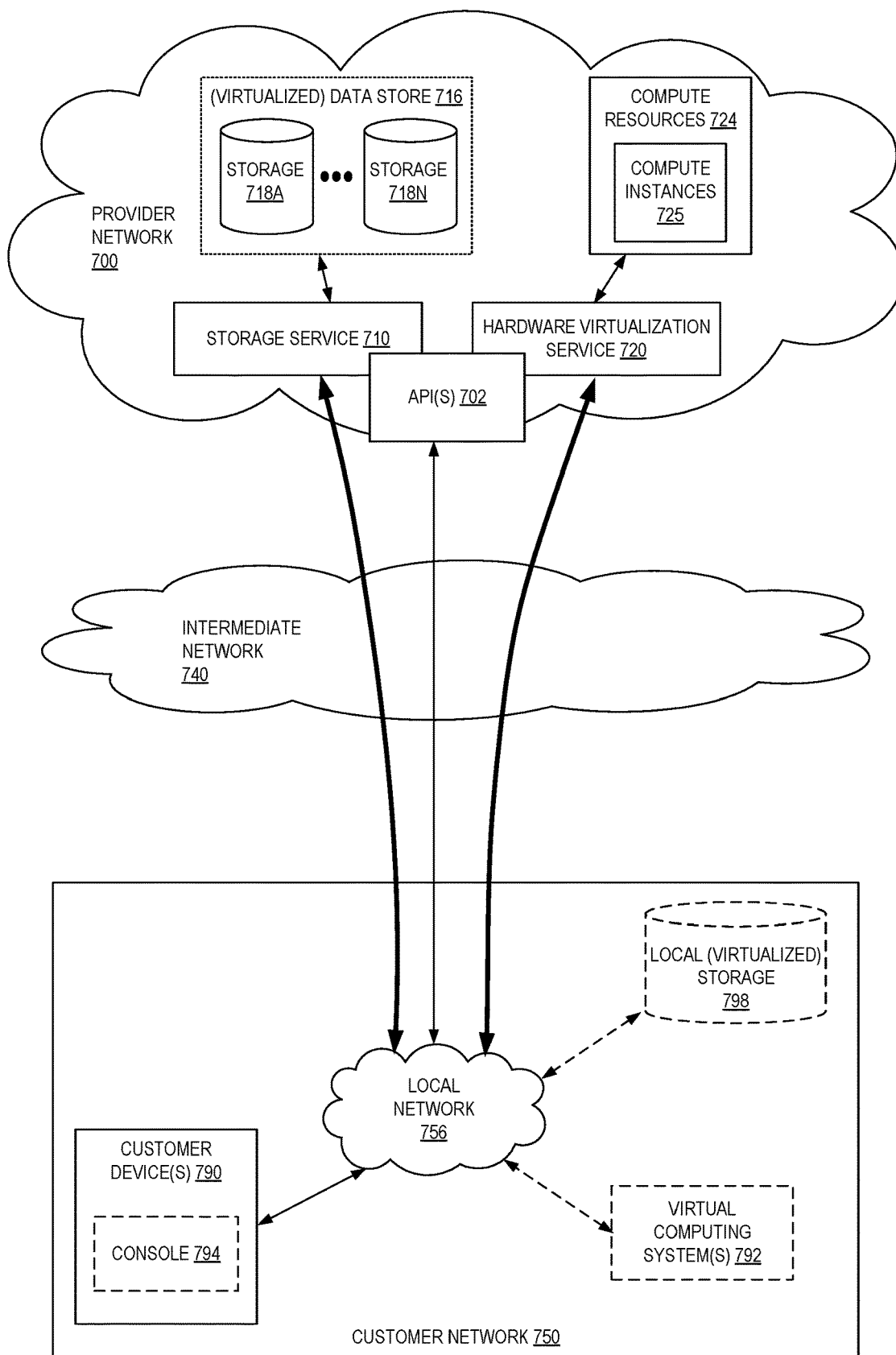
FIG. 7 is a block diagram of an example provider network that provides a storage service and a hardware virtualization service to customers according to some embodiments.

FIG. 7 is a block diagram of an example provider network environment that provides a storage service and a hardware virtualization service to customers, according to some embodiments. A hardware virtualization service 720 provides multiple compute resources 724 (e.g., compute instances 725, such as VMs) to customers. The compute resources 724 may, for example, be rented or leased to customers of a provider network 700 (e.g., to a customer that implements a customer network 750). Each computation resource 724 may be provided with one or more local IP addresses. The provider network 700 may be configured to route packets from the local IP addresses of the compute resources 724 to public Internet destinations, and from public Internet sources to the local IP addresses of the compute resources 724.

The provider network 700 may provide the customer network 750, for example coupled to an intermediate network 740 via a local network 756, the ability to implement virtual computing systems 792 via the hardware virtualization service 720 coupled to the intermediate network 740 and to the provider network 700. In some embodiments, the hardware virtualization service 720 may provide one or more APIs 702, for example a web services interface, via which the customer network 750 may access functionality provided by the hardware virtualization service 720, for example via a console 794 (e.g., a web-based application, standalone application, mobile application, etc.) of a customer device 790. In some embodiments, at the provider network 700, each virtual computing system 792 at the customer network 750 may correspond to a computation resource 724 that is leased, rented, or otherwise provided to the customer network 750.

From an instance of the virtual computing system(s) 792 and/or another customer device 790 (e.g., via console 794), the customer may access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some embodiments, a virtualized data store gateway (not shown) may be provided at the customer network 750 that may locally cache at least some data, for example frequently accessed or critical data, and that may communicate with the storage service 710 via one or more communications channels to upload new or modified data from a local cache so that the primary store of data (the virtualized data store 716) is maintained. In some embodiments, a user, via the virtual computing system 792 and/or another customer device 790, may mount and access virtual data store 716 volumes via the storage service 710 acting as a storage virtualization service, and these volumes may appear to the user as local (virtualized) storage 798.

While not shown in FIG. 7, the virtualization service(s) may also be accessed from resource instances within the provider network 700 via the API(s) 702. For example, a customer, appliance service provider, or other entity may access a virtualization service from within a respective virtual network on the provider network 700 via the API(s) 702 to request allocation of one or more resource instances within the virtual network or within another virtual network.

Illustrative Systems

Figure 8:
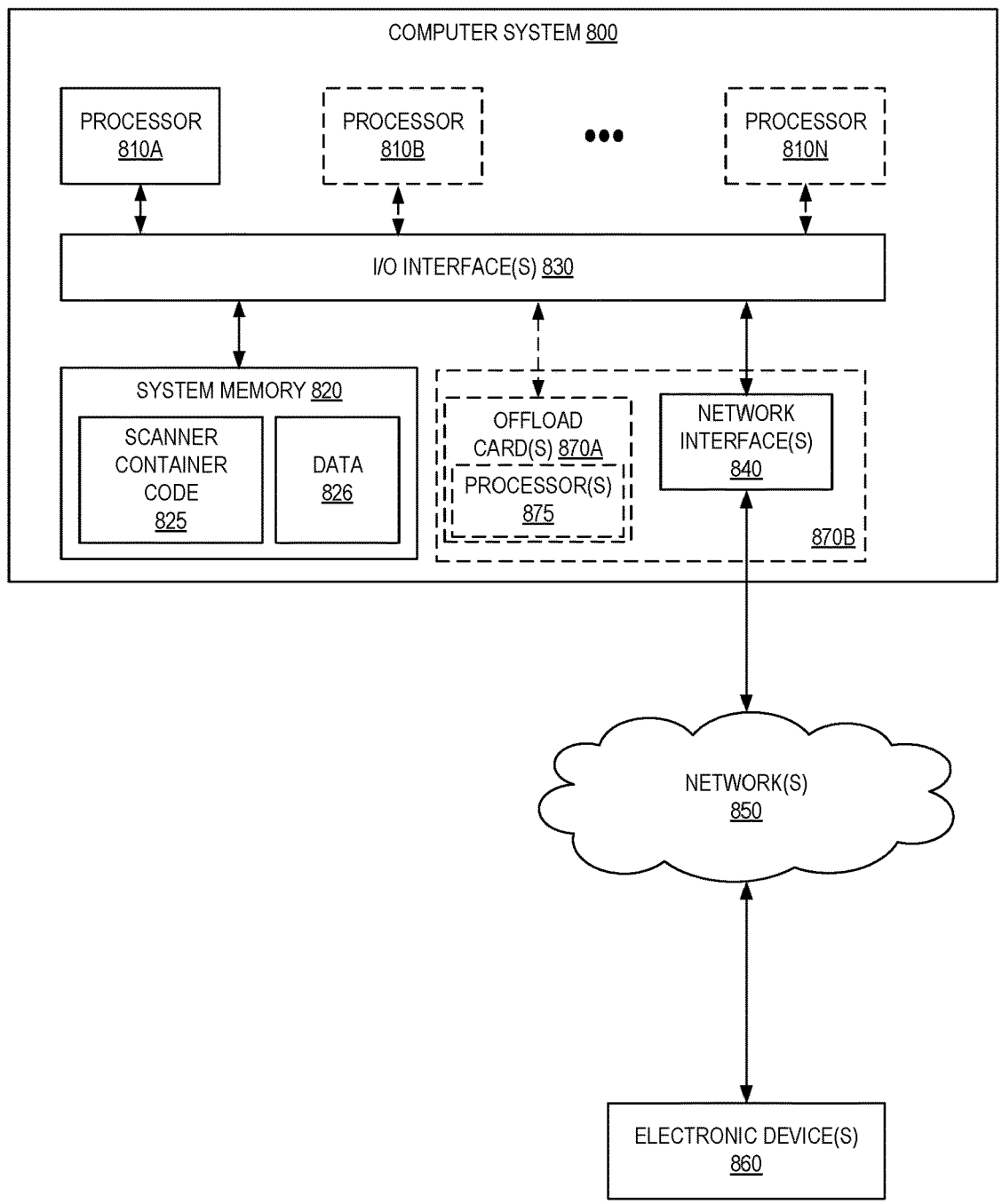
FIG. 8 is a block diagram illustrating an example computer system that may be used in some embodiments.

In some embodiments, a system that implements a portion or all of the techniques described herein may include a general-purpose computer system, such as the computer system 800 illustrated in FIG. 8, that includes, or is configured to access, one or more computer-accessible media. In the illustrated embodiment, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various embodiments the computer system 800 may include one computing device or any number of computing devices configured to work together as a single computer system 800.

In various embodiments, the computer system 800 may be a uniprocessor system including one processor 810, or a multiprocessor system including several processors 810 (e.g., two, four, eight, or another suitable number). The processor(s) 810 may be any suitable processor(s) capable of executing instructions. For example, in various embodiments, the processor(s) 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 may commonly, but not necessarily, implement the same ISA.

The system memory 820 may store instructions and data accessible by the processor(s) 810. In various embodiments, the system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 820 as scanner container code 825 (e.g., executable to implement, in whole or in part, the scanner container 128 and scanning agent 146) and data 826.

In one embodiment, the I/O interface 830 may be configured to coordinate I/O traffic between the processor 810, the system memory 820, and any peripheral devices in the device, including the network interface 840 and/or other peripheral interfaces (not shown). In some embodiments, the I/O interface 830 may perform any necessary protocol, timing, or other data transformations to convert data signals from one component (e.g., the system memory 820) into a format suitable for use by another component (e.g., the processor 810). In some embodiments, the I/O interface 830 may include support for devices attached through various types of peripheral buses, such as a variant of the Peripheral Component Interconnect (PCI) bus standard or the Universal Serial Bus (USB) standard, for example. In some embodiments, the function of the I/O interface 830 may be split into two or more separate components, such as a north bridge and a south bridge, for example. Also, in some embodiments, some or all of the functionality of the I/O interface 830, such as an interface to the system memory 820, may be incorporated directly into the processor 810.

The network interface 840 may be configured to allow data to be exchanged between the computer system 800 and other devices 860 attached to a network or networks 850, such as other computer systems or devices as illustrated in FIG. 1, for example. In various embodiments, the network interface 840 may support communication via any suitable wired or wireless general data networks, such as types of Ethernet network, for example. Additionally, the network interface 840 may support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations, such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, the system memory 820 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include any non-transitory storage media or memory media such as magnetic or optical media, e.g., disk or DVD/CD coupled to the computer system 800 via the I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of the computer system 800 as the system memory 820 or another type of memory. Further, a computer-accessible medium may include transmission media or signals such as electrical, electromagnetic, or digital signals, conveyed via a communication medium such as a network and/or a wireless link, such as may be implemented via the network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, by a scanning agent on a scanner container on a host in a provider network, event data from a plurality of collection agents corresponding to a plurality of customer containers on the host, wherein the host is deployed as part of a container service of the provider network, wherein the host is associated with a container capacity, and wherein at deployment a portion of the container capacity is reserved for one or more scanner containers, wherein the event data is based on or includes system calls intercepted by the plurality of collection agents;
determining, by the scanning agent, the event data matches at least one known threat; and
generating, by the scanning agent, event findings associated with the event data.

2. The computer-implemented method of claim 1, wherein the portion of the container capacity is between one container and up to a maximum percentage of the container capacity reserved for the one or more scanner containers.

3. The computer-implemented method of claim 1, further comprising:
in response to determining the event data matches at least one known threat, scanning one or more files of a file system of a customer container associated with the event data for malware.

4. The computer-implemented method of claim 3, wherein scanning one or more files of a file system of a container associated with the event data for malware, further comprises:
mounting the file system of the customer container to the scanner container.

5. The computer-implemented method of claim 3, further comprising:
scanning at least one region of memory of the host, the at least one region of memory associated with a process corresponding to the event data.

6. The computer-implemented method of claim 1, wherein receiving, by a scanning agent on a scanner container on a host in a provider network, event data from a plurality of collection agents corresponding to a plurality of customer containers on the host, further comprises:
obtaining, by the scanning agent, the event data from a data bus, wherein each collection agent adds the event data as it is collected to the data bus.

7. The computer-implemented method of claim 1, wherein at least one collection agent is embedded in a container image corresponding to at least one customer container to which it is deployed.

8. The computer-implemented method of claim 1, further comprising:
storing the event findings in a storage location of a storage service, wherein in response to storing the event findings a notification is sent to a user associated with at least one customer container corresponding to the event data, wherein the notification includes information about the at least one known threat.

9. The computer-implemented method of claim 1, further comprising:
   determining second event data matches at least one second known threat;
   determining the event data and the second event data correspond to a meta-event; and
   sending the meta-event to a threat scanning service, the threat scanning service to scan the meta-event for known threats.

10. A system comprising:
   a first one or more electronic devices to implement a control plane of a container service in a multi-tenant provider network, the control plane to configure at least a host of the container service; and
   the host implementing a scanner container and a plurality of customer containers, the scanner container including instructions that upon execution cause the scanner container to:
      receiving, by a scanning agent of the scanner container, event data from a plurality of collection agents corresponding to a plurality of customer containers on the host, wherein the host is associated with a container capacity, and wherein at deployment a portion of the container capacity is reserved for one or more scanner containers, wherein the event data is based on or includes system calls intercepted by the plurality of collection agents;
      determine, by the scanning agent, the event data matches at least one known threat; and
      generate, by the scanning agent, event findings associated with the event data.

11. The system of claim 10, wherein the portion of the container capacity is between one container and up to a maximum percentage of the container capacity reserved for the one or more scanner containers.

12. The system of claim 10, wherein the instructions, when executed, further cause the scanner container to:
   in response to determining the event data matches at least one known threat, scan one or more files of a file system of a customer container associated with the event data for malware.

13. The system of claim 12, wherein to scan one or more files of a file system of a container associated with the event data for malware, the instructions, when executed, further cause the scanner container to:
   mount the file system of the customer container to the scanner container.

14. A non-transitory computer-readable medium storing instructions which, when executed by one or more processors of a host computing device, cause the host computing device to implement a scanning agent to perform operations comprising:
   receiving, by the scanning agent on a scanner container on the host computing device in a provider network, event data from a plurality of collection agents corresponding to a plurality of customer containers on the host computing device, wherein the host computing device is deployed as part of a container service of the provider network, wherein the host computing device is associated with a container capacity, and wherein at deployment a portion of the container capacity is reserved for one or more scanner containers, wherein the event data is based on or includes system calls intercepted by the plurality of collection agents;
   determining, by the scanning agent, the event data matches at least one known threat; and
   generating, by the scanning agent, event findings associated with the event data.

15. The non-transitory computer-readable medium of claim 14, wherein the portion of the container capacity is between one container and up to a maximum percentage of the container capacity reserved for the one or more scanner containers.

16. The non-transitory computer-readable medium of claim 14, further comprising instructions which, when executed by the one or more processors of the host computing device, cause the scanning agent to perform operations comprising:
   in response to determining the event data matches at least one known threat, scanning one or more files of a file system of a customer container associated with the event data for malware.

17. The non-transitory computer-readable medium of claim 16, wherein scanning one or more files of a file system of a container associated with the event data for malware further comprises:
   mounting the file system of the customer container to the scanner container.

\* \* \* \* \*